(No Model.) 7 Sheets—Sheet 1.

G. N. TODD.
COTTON HARVESTER.

No. 441,717. Patented Dec. 2, 1890.

Witnesses.

Inventor
George N. Todd
By Jno. G. Elliott
Atty.

(No Model.)　　　　　　G. N. TODD.　　　7 Sheets—Sheet 3.
COTTON HARVESTER.

No. 441,717.　　　　　　　　Patented Dec. 2, 1890.

(No Model.) 7 Sheets—Sheet 4.

G. N. TODD.
COTTON HARVESTER.

No. 441,717. Patented Dec. 2, 1890.

Witnesses. Inventor
George N. Todd
By Jno. G. Elliott
Atty.

(No Model.) 7 Sheets—Sheet 5.
G. N. TODD.
COTTON HARVESTER.
No. 441,717. Patented Dec. 2, 1890.
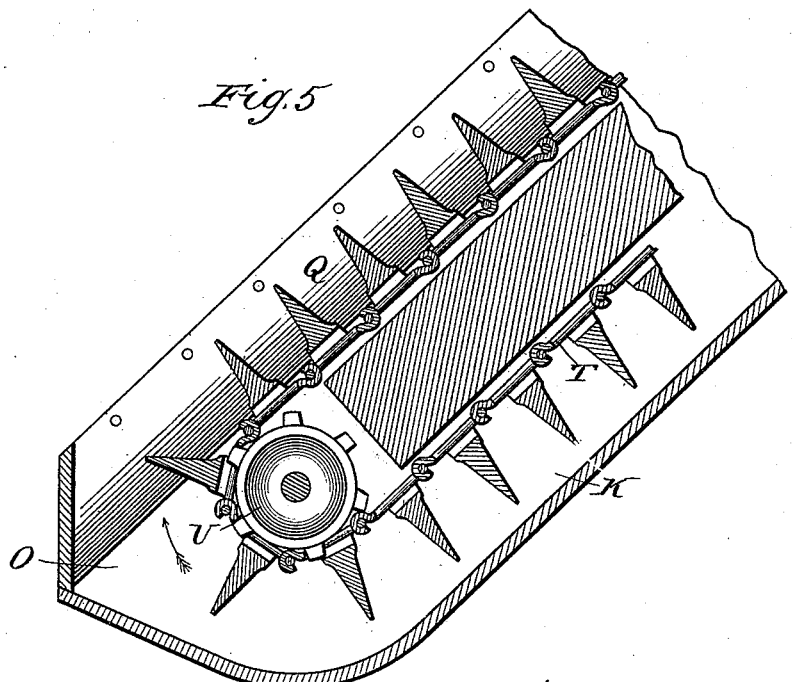
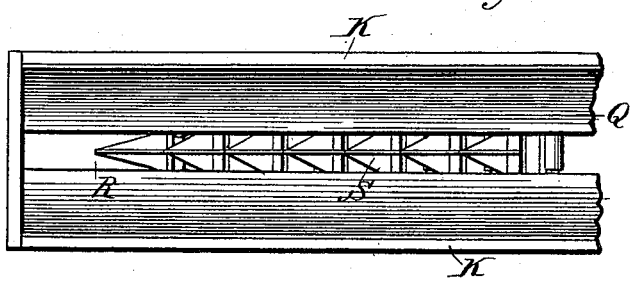
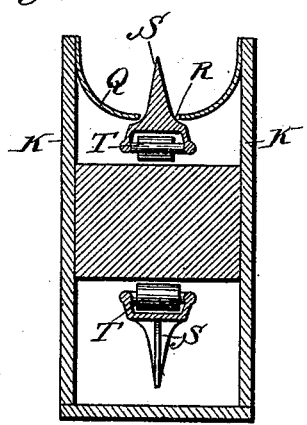
Witnesses. Inventor
George N. Todd
By Jno. G. Elliott
Atty.

(No Model.) 7 Sheets—Sheet 6.

G. N. TODD.
COTTON HARVESTER.

No. 441,717. Patented Dec. 2, 1890.

Witnesses. Inventor.
George N. Todd
By Jno. G. Elliott
Atty.

(No Model.) 7 Sheets—Sheet 7.
G. N. TODD.
COTTON HARVESTER.
No. 441,717. Patented Dec. 2, 1890.
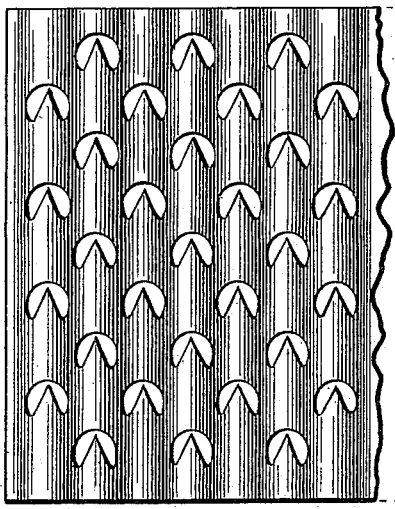
Fig. 10.
Fig. 11.
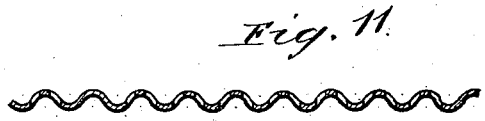
Fig. 12
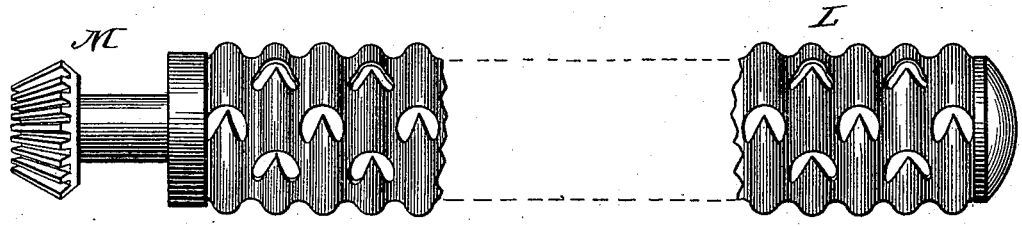
Witnesses.
W. Rossiter
Will R. Cushmedro
Inventor.
George N Todd
By Jno. G. Elliott
Atty.

UNITED STATES PATENT OFFICE.

GEORGE N. TODD, OF CHICAGO, ILLINOIS, ASSIGNOR TO THE TODD COTTON HARVESTER COMPANY, OF SAME PLACE.

COTTON-HARVESTER.

SPECIFICATION forming part of Letters Patent No. 441,717, dated December 2, 1890.

Application filed August 4, 1887. Serial No. 246,088. (No model.)

*To all whom it may concern:*

Be it known that I, GEORGE N. TODD, a citizen of the United States, residing at Chicago, county of Cook, and State of Illinois, have invented certain new and useful Improvements in Cotton-Harvesters, of which the following is a specification.

This invention relates to improvements in cotton-harvesters in which the cotton-picking devices are supported in a suitable frame carried upon a single pair of wheels from which the initial motive power is derived.

The prime object of this invention is to simplify the construction and thereby reduce the cost of manufacture, and at the same time so construct the various portions of the machine, particularly the main frame thereof, as to materially increase its strength and durability.

Other objects are to provide picker-stems and cleaner-disks of a novel construction, whereby the gathering and removal of the cotton from the stems are materially facilitated, and to provide certain details of construction in the carrying out of my invention, all as illustrated in the accompanying drawings, in which—

Figure 1:
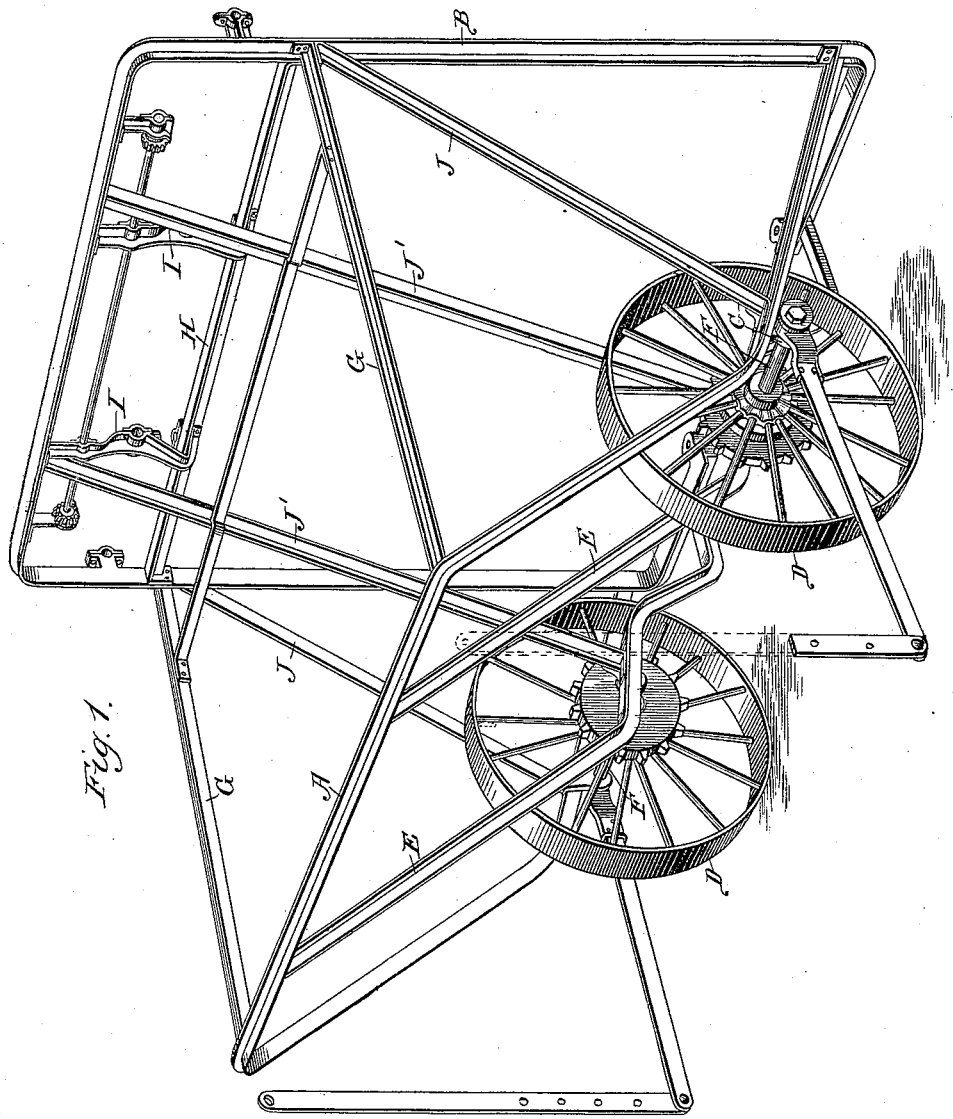
Figure 2:
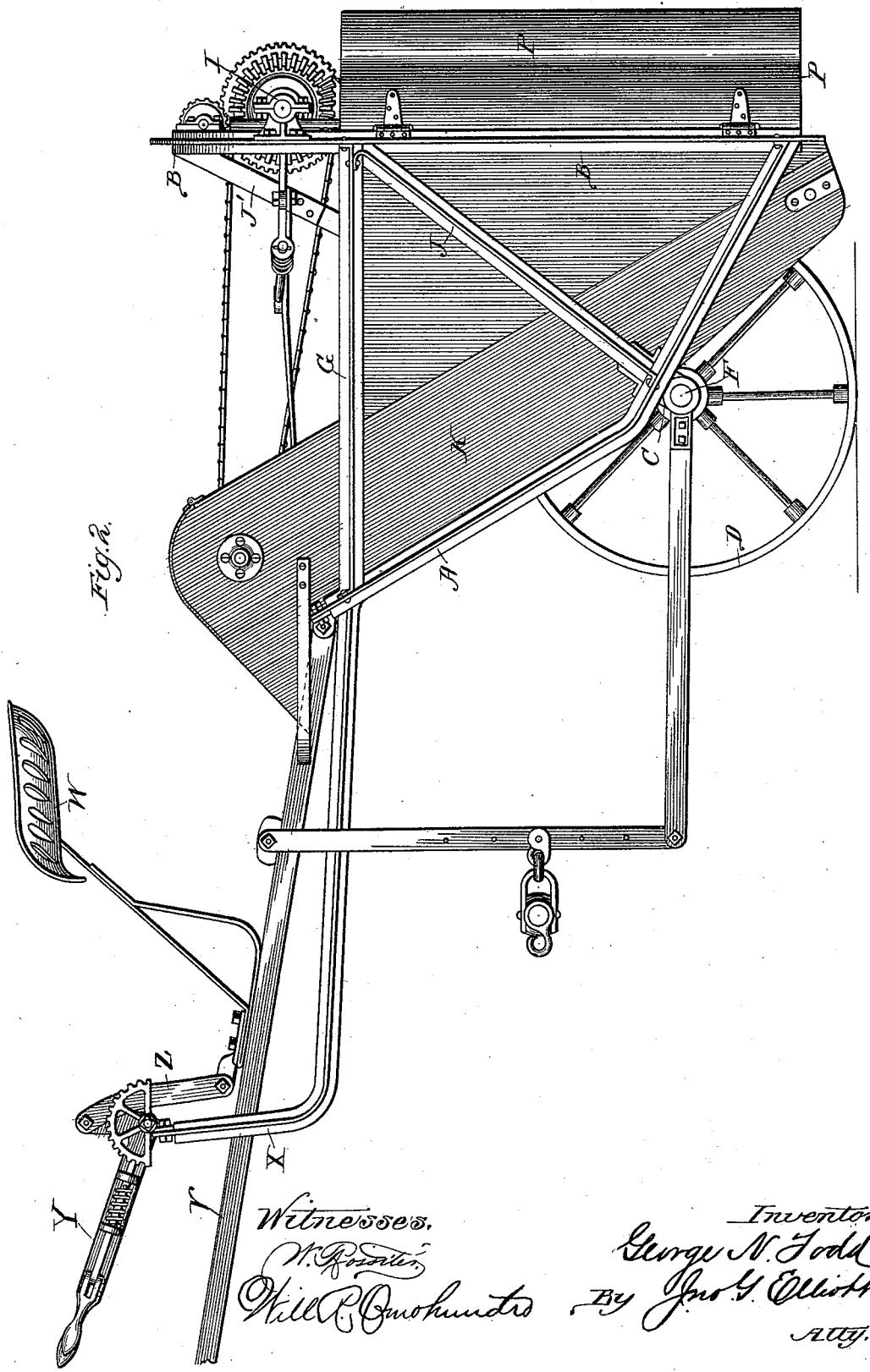
Figure 3:
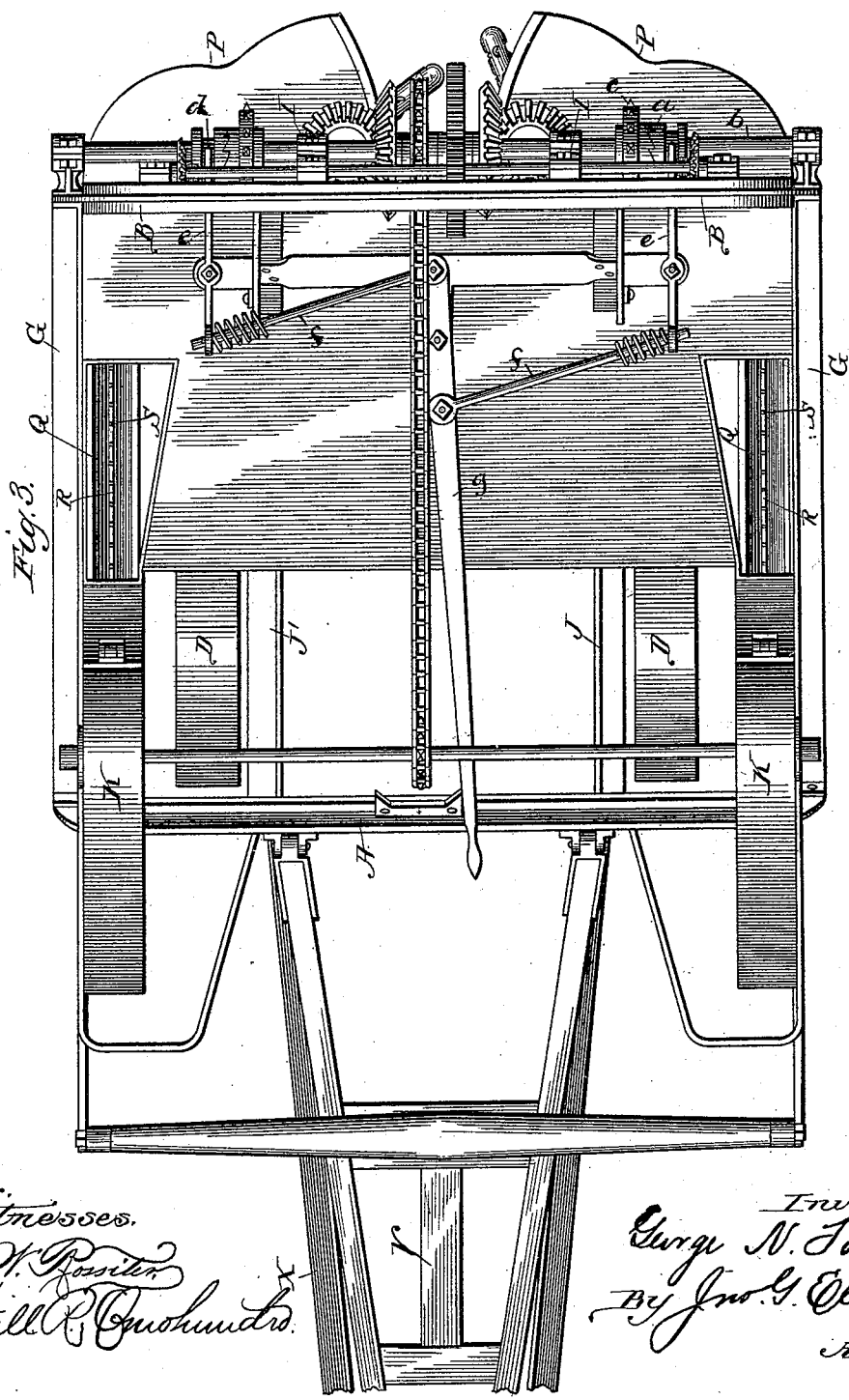
Figure 4:
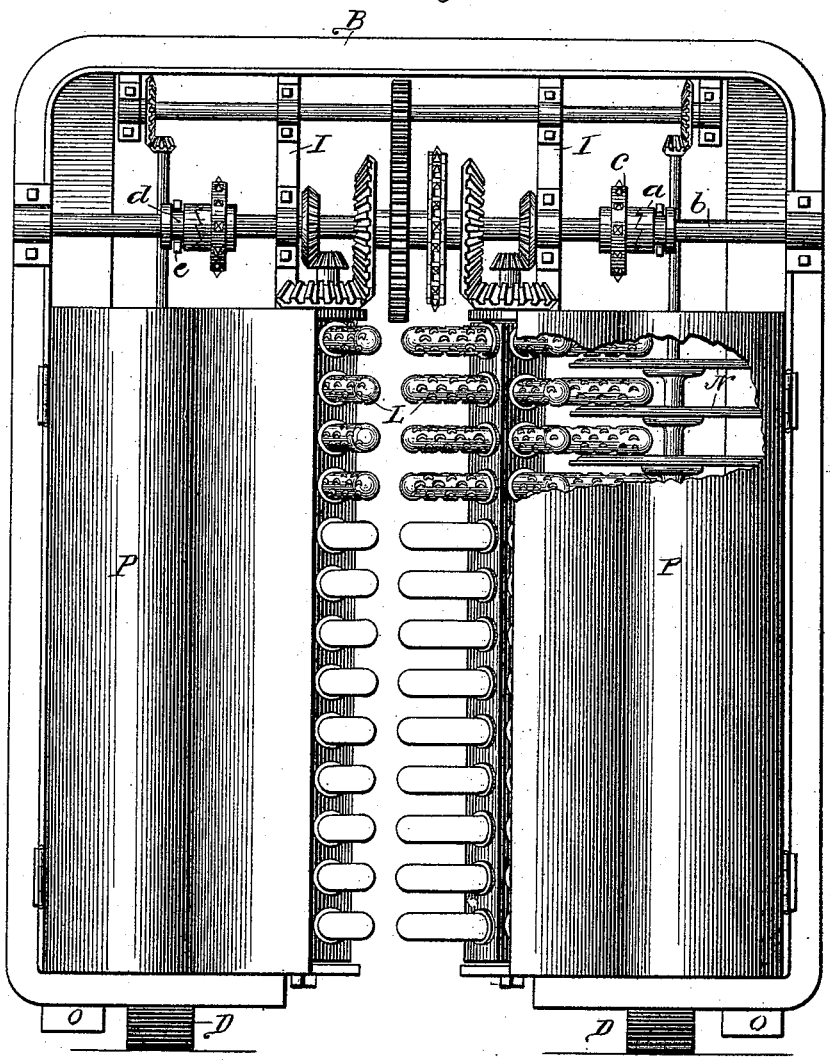
Figure 8:
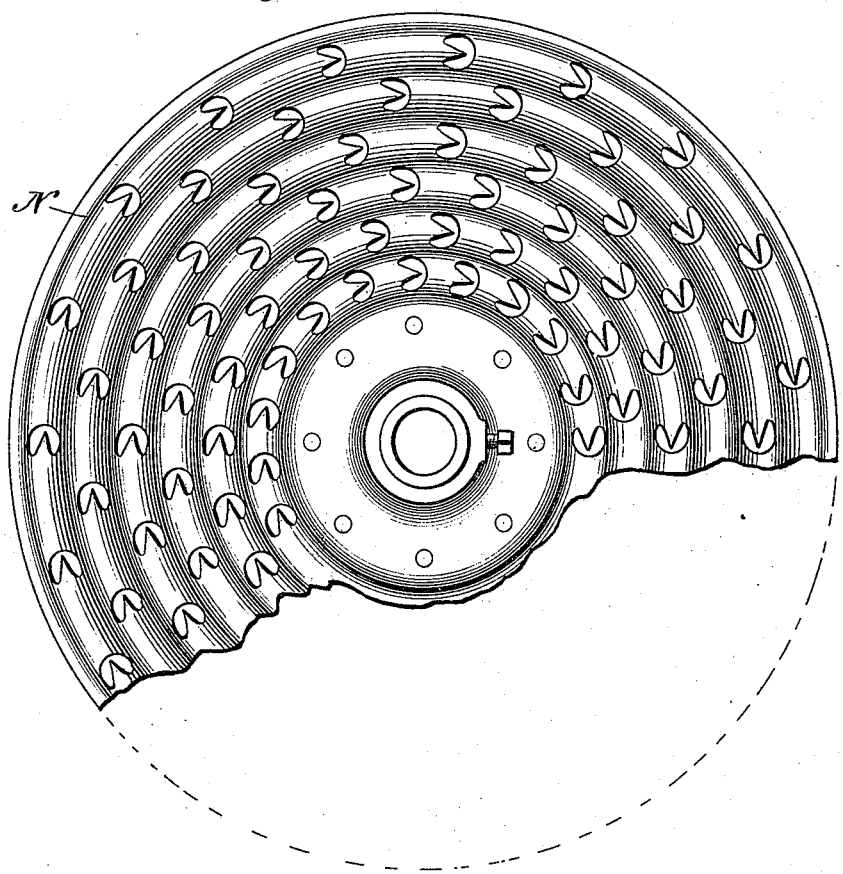
Figure 9:
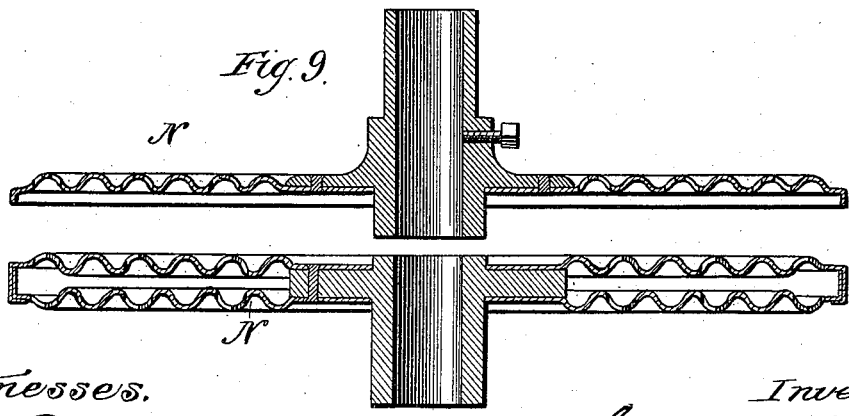

Figure 1 represents a perspective view of the metallic skeleton frame for supporting the operating parts of my machine; Fig. 2, a side elevation of the machine complete; Fig. 3, a plan view thereof; Fig. 4, a rear elevation of the same; Fig. 5, a central vertical section through the lower end of one of the elevated chutes; Fig. 6, a plan view thereof; Fig. 7, a transverse section of the same; Fig. 8, an enlarged plan view of one of the cleaner-disks; Fig. 9, central vertical sections through single and double disks, respectively; Fig. 10, a plan view of a portion of the blank from which the picker-stems are formed; Fig. 11, a transverse section thereof, and Fig. 12 a side elevation of one of the picker-stems complete.

Similar letters of reference indicate the same parts in the several figures of the drawings.

The supporting-frame of this machine consists entirely of metal, preferably of channel or angle iron, formed into front and rear arches A B, the latter standing in a vertical position to the rear of the main driving-wheels, while the former stands at an oblique angle and is united at its lower end with the rear arch, from which point it extends forwardly in an oblique or inclined position, to the center of the inclined sides of which are secured the boxes C, in which work the axles of the main wheels D, as clearly shown in Figs. 1 and 2, the said arch A being provided with additional brace-bars E, extending parallel therewith, but to the inside of the wheels D, thereby forming inside bearings for the short axles F of said wheels, the said brace-bars being secured at their ends, respectively, to the arches A and B. These arches are also connected near the top thereof by the horizontal longitudinal brace-bars G, which extend sufficiently forward of the main portion of the machine to form a fulcrum or bearing for the mechanism employed for tilting the entire machine upon its bearings, as will hereinafter be more fully described. The rear arch B is strengthened by a transverse brace-bar H, extending across the machine near the top thereof, to which and to the top of said arch are secured the brackets I, constituting bearings for the main and supplemental shafts, to which power is communicated from the main wheels in any well-known and convenient manner, and from which motion is imparted to all the operative parts of my device.

The operation of the machine may be readily controlled by controlling the transmission of power therefrom to the operative parts of the machine—such, for instance, as by means of a clutch *a*, mounted upon the main or drive shaft *b*, one half of which is keyed on the shaft and provided with a sprocket-wheel *c* for receiving power from the ground-wheels D, while the other half of the clutch is splined and longitudinally slidable upon the shaft and provided with an annular groove *d*, in which works the free end of a yoke-lever *e*, pivoted to the frame of the machine, with the opposite end of which connects a link *f*, in turn pivotally connected with a hand-lever *g*. This mechanism is duplicated at each side of the machine, as shown, and one of the links $f$ is connected with the lever at one side to the other at the opposite side of the pivot thereof, so that the same movement will be simultaneously imparted to the clutch by the operation of the lever $g$. The side frames—that is to say, the sides of the arches—are further strengthened by the inclined brace-bars J J', secured, respectively, to said arches, and to which former is in turn secured the housing K for inclosing the elevating devices for transferring the cotton from the receiving-chamber to the receptacles from which it is removed. The main frame is also united and housed over at the top, as shown in Fig. 2, for the purpose of protecting the operating parts of my device from the weather.

It is obvious that the frame of a cotton-harvester when constructed after the manner just described will not only be more economical, but its strength and durability will be greatly increased.

The mechanism employed for operating the picker-stems shown in this machine is exactly like that shown and described in my application for Letters Patent of the United States, Serial No. 246,087, filed of even date herewith, and it is therefore not necessary to herein describe their operation. The picker-stems, however, and also the cleaning devices are believed to be of novel construction, the picker-stems L being illustrated more in detail in Figs. 10, 11, and 12. These stems are provided with the usual gear M for imparting a rotary movement thereto, to which is secured a corrugated cylinder composed of sheet metal, into the annular ribs of which are stamped the teeth for gathering the cotton. Stems so constructed are especially adapted for being cleaned by stripping or cleaning devices, the surface of which moves obliquely or longitudinally along the stems instead of transversely of said stems, which result is due to the corrugated surface thereof, thereby rendering the drawing of cotton along the stems more easy than if the surface of the stems were plain. This latter statement also holds good with the cleaner-disks N, which are likewise formed of corrugated metal, the ribs of which extend concentrically and which are caused to revolve almost in contact with said stems, but which depend upon centrifugal force alone for discharging cotton therefrom, for when the cotton is released by such force from the tooth with which it is engaged it will be thrown off the disk without engagement with any other tooth. These cleaner-disks may be made single, as shown in the first section of Fig. 9, for operating upon one horizontal series of picker-stems only, or double, as shown in second section of said figure, for operating simultaneously upon two series of picker-stems, one above and one below.

In order to facilitate the discharge of the cotton from these picking-cylinders into the cotton-receiving chamber O at the bottom of the machine, removable shields P are provided, surrounding said cleaners and hinged to the rear arch B, so as to direct the cotton into said chamber. Leading from said chamber upwardly in an inclined position toward the forward part of the machine is a chute Q, consisting of a curved sheet-metal trough secured at its edges to the housing K and provided with a central longitudinal slot R, extending its entire length, through which project fingers S, secured at regular intervals to a sprocket-chain T, working in a space below said trough within the housing, and around sprocket-wheels U, located at the upper and lower ends of said housing, to which power is transmitted in any well-known and convenient manner. As the cotton is thrown into the receiving-compartment it falls upon these fingers, which, traveling up the inclined chute, carry the cotton with them to the upper end thereof, where it is discharged into baskets, bags, or other suitable receptacles provided for that purpose.

This machine as a whole is designed to tilt upon its axles, if desired, so that the picker-stems may be caused to enter the cotton-plant at an angle, and to this end the tongue V is pivoted at its rear end to the arch A and having its forward end rigidly supported by a yoke upon the draft-animals.

The driver's seat W is mounted upon the tongue to the front of the machine, and just forward of this seat is also mounted, but upon an arched extension of the brace-bar G, an ordinary spring-locking bell-crank lever Y, which is connected through the medium of a link Z to the said tongue, by means of which lever, as will be readily understood, the driver is enabled to tilt the machine.

Having described my invention, what I claim, and desire to secure by Letters Patent, is—

1. In a cotton-harvester, a metallic supporting-frame consisting of a front and rear arch supported upon a single pair of wheels united by transverse and longitudinal brace-rods and by diagonal brace-bars extending from about the center of the sides of the front arch to near the top of the rear arch and having an open passage-way through the center, substantially as described, and for the purpose set forth.

2. In a cotton-harvester, the vertically-arranged series of cleaner-disks and vertically-arranged series of picker-stems alternating therewith, located at the rear end of the machine, in combination with a curved shield adjacent thereto and lying to the rear thereof and detachably connected with or hinged to the supporting-frame, substantially as described.

3. A metallic disk-like cleaner having picking-teeth stamped out of one or both faces thereof and within its periphery, substantially as described, and for the purpose set forth.

4. A metallic disk-like cleaner having integral picking-teeth whose points lie in the same plane with the surface of the disk, substantially as described.

5. In a cotton-harvester, a metallic disk-like cleaner having a concentrically corrugated or ribbed surface and picking-teeth stamped out of said corrugations or ribs, substantially as described.

GEORGE N. TODD.

Witnesses:
W. W. ELLIOTT,
WILL R. OMOHUNDRO.